United States Patent
Melack

(10) Patent No.: US 12,300,853 B1
(45) Date of Patent: May 13, 2025

(54) HYBRID BATTERY INTERCONNECTS

(71) Applicant: Wisk Aero LLC, Mountain View, CA (US)

(72) Inventor: John Melack, Redwood City, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 18/311,675

(22) Filed: May 3, 2023

Related U.S. Application Data

(62) Division of application No. 16/734,249, filed on Jan. 3, 2020, now Pat. No. 11,742,552.

(51) Int. Cl.
| | |
|---|---|
| *H01M 50/509* | (2021.01) |
| *B23K 9/02* | (2006.01) |
| *C22F 1/00* | (2006.01) |
| *C22F 1/04* | (2006.01) |
| *C22F 1/08* | (2006.01) |
| *H01M 50/224* | (2021.01) |
| *H01M 50/271* | (2021.01) |
| *H01M 50/287* | (2021.01) |

(Continued)

(52) U.S. Cl.
CPC ............ *H01M 50/509* (2021.01); *B23K 9/02* (2013.01); *C22F 1/04* (2013.01); *H01M 50/224* (2021.01); *H01M 50/271* (2021.01); *H01M 50/287* (2021.01); *H01M 50/507* (2021.01); *H01M 50/514* (2021.01); *H01M 50/516* (2021.01); *H01M 50/519* (2021.01); *H01M 50/528* (2021.01); *H01M 50/534* (2021.01); *H01R 4/62* (2013.01); *C22F 1/00* (2013.01); *C22F 1/08* (2013.01); *H01M 50/55* (2021.01)

(58) Field of Classification Search
CPC .............. H01M 50/507; H01M 50/55; H01M 50/284; H01M 50/519; H01M 50/287
See application file for complete search history.

(56) References Cited

U.S. PATENT DOCUMENTS

| | | |
|---|---|---|
| 2002/0015882 A1 | 2/2002 | Yang |
| 2010/0247998 A1 | 9/2010 | Hostler et al. |

(Continued)

FOREIGN PATENT DOCUMENTS

| | | | | |
|---|---|---|---|---|
| JP | H04315524 A | * | 11/1992 | ............. B21C 23/22 |

OTHER PUBLICATIONS

L&L Special Furnace, "Types of Aluminum Heat Treatments", <https://llfurnace.com/blog/types-of-aluminum-heat-treatments/> (Year: 2018).*

(Continued)

*Primary Examiner* — Matthew T Martin
*Assistant Examiner* — Jessie Walls-Murray
(74) *Attorney, Agent, or Firm* — Kilpatrick Townsend & Stockton LLP

(57) ABSTRACT

The embodiments describe a system and the corresponding assembly techniques of a battery submodule top cover. The battery submodule top cover has at least one electrical hybrid interconnect coupled to a substrate. The hybrid interconnect comprises at least a first portion made of a first metal type, and a second portion made of a second metal type. The first portion and the second portion of the hybrid interconnect are joined together such that an electrical connection may be made between two battery cell tabs where each battery cell tab is made of a different type of metal.

14 Claims, 8 Drawing Sheets

(51) Int. Cl.
*H01M 50/507* (2021.01)
*H01M 50/514* (2021.01)
*H01M 50/516* (2021.01)
*H01M 50/519* (2021.01)
*H01M 50/528* (2021.01)
*H01M 50/534* (2021.01)
*H01M 50/55* (2021.01)
*H01R 4/62* (2006.01)

(56) References Cited

U.S. PATENT DOCUMENTS

| | | |
|---|---|---|
| 2011/0020690 A1 | 1/2011 | Khakhalev et al. |
| 2011/0064993 A1* | 3/2011 | Ochi ............... H01M 50/00 429/158 |
| 2012/0015225 A1* | 1/2012 | Hattori ............ H01M 50/536 429/153 |
| 2012/0183840 A1* | 7/2012 | Lee ................. H01M 50/296 429/158 |
| 2013/0188296 A1* | 7/2013 | Widhalm ............ H01B 1/026 205/271 |
| 2013/0200700 A1* | 8/2013 | Ohkura ............ H01M 10/425 320/136 |
| 2014/0017532 A1 | 1/2014 | Nishihara et al. |
| 2015/0086867 A1 | 3/2015 | Oda et al. |
| 2015/0243947 A1 | 8/2015 | Seto et al. |
| 2018/0175358 A1* | 6/2018 | Lin .................. H01M 50/645 |
| 2019/0296316 A1 | 9/2019 | Wang et al. |
| 2019/0355954 A1 | 11/2019 | Dawley |
| 2020/0313139 A1 | 10/2020 | Patterson et al. |

OTHER PUBLICATIONS

Pankade et al., "The influence of heat treatments on electrical conductivity and corrosion performance of AA 7075-T6 aluminium alloy", 2nd International Conference on Materials Manufacturing and Design Engineering, Procedia Manufacturing 20 pp. 53-58, 10.1016/j.promfg.2018.02.007 (Year: 2018).*

ASM, "Heat Treating of Copper and Its Alloys", ASM International Handbook, vol. 4E, <https://doi.org/10.31399/asm.hb.v04e.9781627081696> (Year: 2016).*

U.S. Appl. No. 16/734,249, "Advisory Action", Apr. 22, 2022, 4 pages.

U.S. Appl. No. 16/734,249, "Final Office Action", Feb. 7, 2022, 25 pages.

U.S. Appl. No. 16/734,249, "Non-Final Office Action", Jul. 20, 2021, 15 pages.

U.S. Appl. No. 16/734,249, "Notice of Allowance", Feb. 3, 2023, 13 pages.

* cited by examiner

HYBRID BATTERY INTERCONNECTS

CROSS-REFERENCE TO RELATED APPLICATIONS

This application is a divisional of, and claims priority to, U.S. Non-Provisional application Ser. No. 16/734,249, filed on Jan. 3, 2020, and titled "Hybrid Battery Interconnects," the disclosure of which is incorporated herein by reference for all purposes.

BACKGROUND OF THE INVENTION

New types of battery submodules have been developed which include interconnects coupled to a top cover of a battery assembly that can connect to tabs of battery cells. It is sometimes required in battery design for an interconnect to connect to tabs of different metals. When an interconnect made of a first metal is coupled to a battery cell tab made of a second, dissimilar metal, the weld quality is less than ideal and is prone to failure. Losing a tab connection may yield to the failure of an entire battery submodule, which may be mission critical for battery-powered vehicles, such as aerial vehicles. Additional improvements to the strength and electrical properties of the connections between tabs and interconnects of dissimilar metals would be desirable.

BRIEF SUMMARY OF THE INVENTION

Embodiments provide hybrid interconnects comprising at least two portions: a first portion made of a first kind of metal and a second portion made of another kind of metal. In some embodiments, the first kind of metal and the second kind of metal may be two separate types of metals (e.g. two different chemical elements such as copper and aluminum). In other embodiments, the first kind of metal and the second kind of metal may refer to the same chemical element that underwent a treatment to alter the physical and/or chemical properties of the metal (e.g. annealing, heat treatment). The hybrid interconnects may be used to create more robust connections between a hybrid interconnect and a battery cell tab made of dissimilar metals. Embodiments may be implemented in numerous ways, including using different heat treatment techniques on two different sections of an interconnect, coupling two different kinds of metals together to form an interconnect, placing a cap of metal over a different kind of metal, cladding a metal of one kind onto a strip of metal of another kind.

An embodiment is directed to a battery submodule top cover comprising a substrate, a circuit board formed on the substrate, and a plurality of interconnects coupled to the substrate and in electrical connection with the circuit board. The plurality of interconnects include at least one hybrid interconnect. Each interconnect is adapted to couple to a first set of battery cell tabs made of a first metal, and a second set of battery cell tabs made of a second metal. The hybrid interconnect includes a first portion and a second portion having different physical properties than the first portion. The first portion of the hybrid interconnect is adapted to couple to a first battery cell tab made of the first metal, and the second portion of the hybrid interconnect is adapted to couple to a second battery cell tab made of the second metal.

Another embodiment provides a system comprising a container, a plurality of battery cells provided in the container, and the battery submodule top cover described above covering an opening of the container. Each battery cell includes two battery cell tabs.

One embodiment provides a method including welding a circuit board on a substrate. The method further comprises coupling a plurality of interconnects on the substrate. The plurality of interconnects include at least one hybrid interconnect having a first portion and a second portion. The method also includes forming the first portion of the hybrid interconnect with different physical properties than the second portion of the hybrid interconnect. The method further comprises electrically connecting the plurality of interconnects to the circuit board. Each interconnect is adapted to be coupled to a first set of battery cell tabs made of a first metal, and a second set of battery cell tabs made of a second metal. The first portion of the hybrid interconnect is adapted to couple to a first battery cell tab made of the first metal, and the second portion of the hybrid interconnect is adapted to couple to a second battery cell tab made of the second metal.

BRIEF DESCRIPTION OF THE DRAWINGS

Various embodiments are disclosed in the following detailed description and the accompanying drawings.

DETAILED DESCRIPTION OF THE INVENTION

Figure 1:
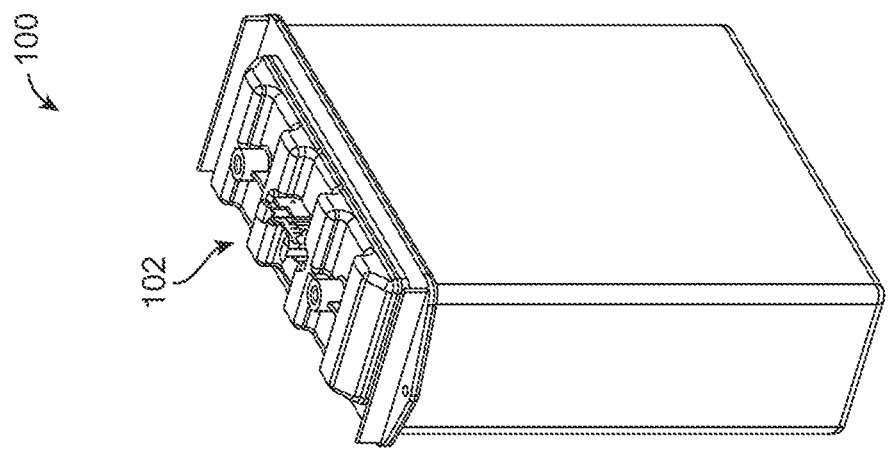
FIG. 1 is an exploded-view diagram illustrating the components of a battery assembly including a battery submodule top cover with a substrate and interconnects, according to various embodiments.
Figure 1:
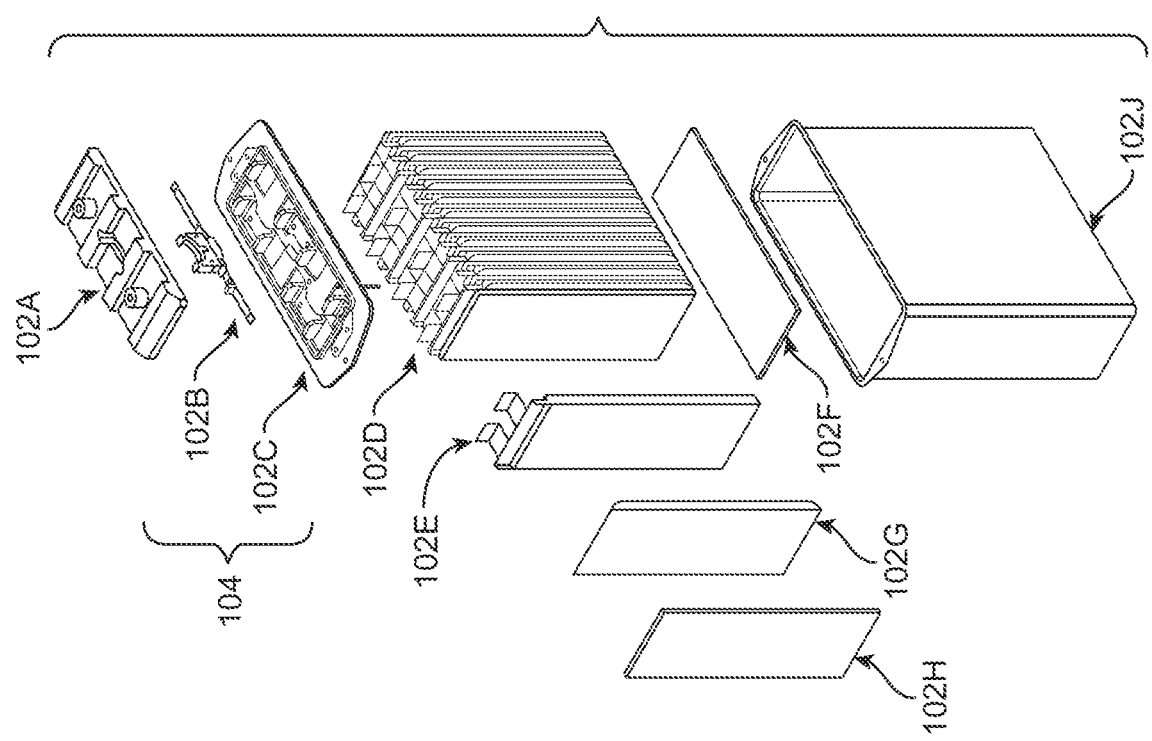

A detailed description of one or more embodiments of the inventions is provided below along with accompanying figures that illustrate the principles of the invention. The invention is described in connection with such embodiments, but the invention is not limited to any embodiment. The scope of the invention is limited exclusively by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details.

Various embodiments of improvements to a battery submodule top cover are described herein. According to various embodiments, the battery submodule top cover may include conductive tabs, interconnects (e.g., strips of metal or metals capable of connecting battery terminals in series or in parallel), a substrate, and a printed circuit board. For simplicity and ease of explanation, at least some of the features and/or improvements are described separately or individually below. Naturally, various battery submodule embodiments can include various combinations of features and/or improvements even though a particular combination of features and/or improvements may not necessarily be described specifically herein.

In some embodiments, a battery submodule top cover includes a substrate where various components may be coupled, attached and/or embedded, a circuit board joined to the substrate, and a plurality of interconnects coupled to the substrate and in electrical connection to the circuit board. The plurality of interconnects may include at least one hybrid interconnect having two portions with different physical and/or chemical properties that are made to more effectively connect battery cell tabs. For example, a first portion of the hybrid interconnect may be adapted to form a stronger weld with a first type of battery cell tab, while a second portion of the hybrid interconnect may be adapted to form a stronger weld with a second type of battery cell tab. The first portion may be made from one type of metal (e.g. aluminum) and the second portion may be made out of a second type of metal (e.g. copper). Accordingly, the first portion may form a stronger weld (e.g. via ultrasonic welding) with an aluminum battery cell tab than the second portion. Similarly, the second portion may form a stronger weld (e.g. via ultrasonic welding) with a copper battery cell tab than the first portion.

In some embodiments, a first portion and a second portion of a hybrid interconnect may be laid overtop one another such that a section of the first portion may extend overtop a section of the second portion. The two portions may be coupled by any method of coupling, such as by bolting them together, joining through welding, etc.

In some embodiments, a first portion of a hybrid interconnect may be a strip of a first metal, and a second portion may be formed of a single shaped piece of a different type of metal. The first portion may be formed to couple with the second portion such that the first portion forms an outer layer over at least a section of the second portion.

In some embodiments, a first portion of a hybrid interconnect may be formed of a single shaped piece of material, and a second portion may be a strip of dissimilar metal. The second portion may be formed to mate overtop with the first portion, creating a cap of dissimilar metal over one end of the interconnect.

In some embodiments, a hybrid interconnect may be formed of two portions, where the first portion is made of annealed metal to form a soft metal portion, and the second portion is made of heat treated metal to form a hard metal portion.

System Overview

FIG. 1 is an exploded-view diagram illustrating an exemplary battery assembly 100, according to some embodiments of the invention. A fully-assembled battery is shown from above with battery assembly 102, and the components of battery assembly 102 are illustrated by 102(A-J).

Battery assembly 102 comprises several submodules. One such submodule is the battery submodule top cover 104, which comprises components 102B-C. Substrate 102C may be formed out of any suitable material, such as a plastic plate. Numerous components, such as a plurality of interconnects, may be adapted to couple with substrate 102C such that the components will be secured in place. The plurality of interconnects may include at least one hybrid interconnect. Printed circuit board (PCB) 102B is a printed circuit board that may be formed to and coupled with substrate 102C. Printed circuit board 120B may be coupled by being welded onto the substrate 102C. PCB 102B may be an electrical connection with interconnects in substrate 102C and each interconnect may be adapted to be coupled to a first set of battery cell tabs made from a first metal and to a second set of battery cell tabs made of a second metal. The interconnects may electrically link the battery cell tabs to the PCB 102B, and PCB 102B may further electrically link the battery cell tabs to a plug that can function as an electrical connector. PCB 102B may also include any hardware, firmware, and/or software used for monitoring and/or management of the battery submodules.

Substrate 102C may serve as a top plate for battery cell submodule 102D. Substrate 102C may have holes cut into it to allow battery cell tabs in electrical connection with either battery cell anodes or cathodes to protrude through substrate 102C and make electrical contact with interconnects that are coupled to substrate 102C. Battery cell tabs may be formed by parallel welding tabs from a plurality of battery cells together. The one or more of the interconnects coupled to 102C may be formed by series welding battery cell tabs along the same side of the battery submodule top cover 104 in electrical connection with PCB 102B.

Battery cell submodule 102D is a stacked assembly of a plurality of battery cells. Each individual battery cell comprises components 102E-H. Battery cell 102E is a battery cell with at least two battery cell tabs. A plurality of tabs of the same material may be welded together in parallel to form a battery cell tab. Battery cell 102E can be any kind of battery cell (e.g., a pouch cell) suitable for the design of battery assembly 100. Insulation layers 102G and 102H may be layers made from any material for the purpose of providing thermal insulation between each battery cell 102E in the battery cell submodule 102D. Base layer 102F is a layer of material on which to stack the battery cells 102E and insulation layers 102G and 102H. Base layer 102F may be made of an insulating material (e.g., aerogel, fiberglass, etc.) and may provide thermal and electrical insulation between the battery cell 102E and can 102J. Can 102J is a can that may serve as a container to hold battery cell submodule 102D and that may be coupled with the battery submodule top cover 104. Shroud cover 102A is a cover that may be coupled to the can 102J. Shroud cover 102A may be formed to fit around electrical connection plugs, tabs, and interconnects of the battery submodule top cover 104.

Figure 2:
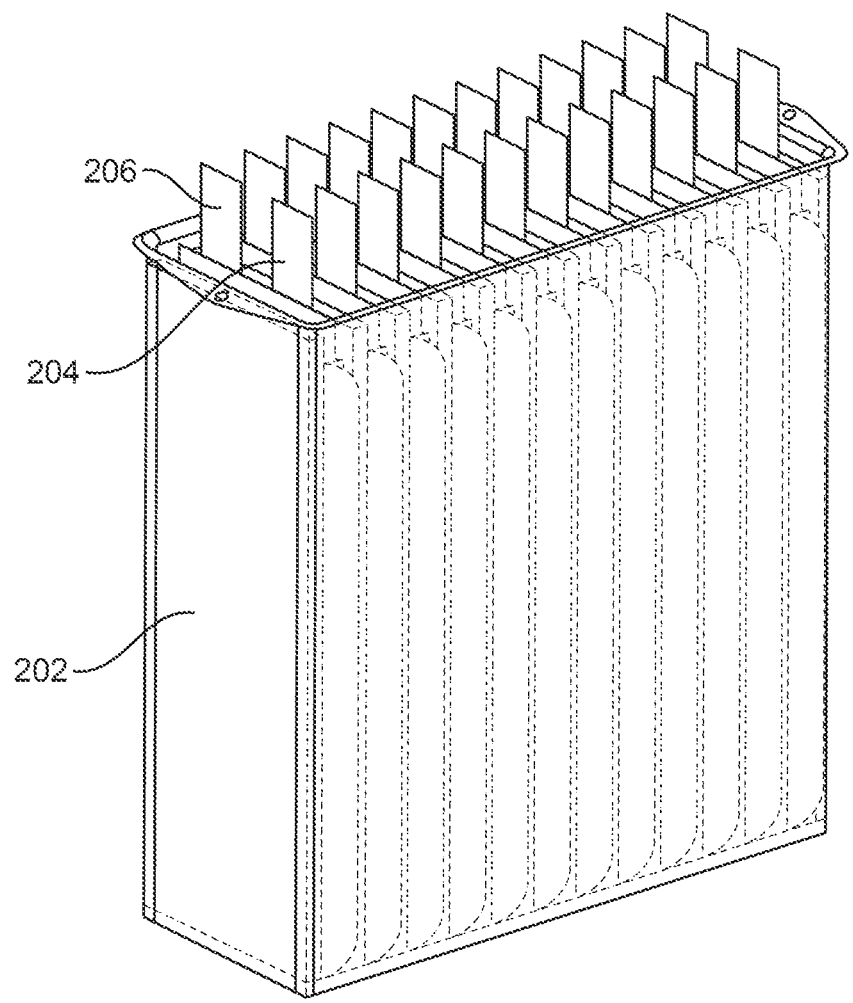
FIG. 2 is a diagram illustrating an example of stacked battery cells with tabs of different types of metals, according to various embodiments.

FIG. 2 is a diagram of an example battery cell submodule with battery cell tabs made of different types of metals. First tab 204 may be made of any metal suitable to the design of the battery (e.g., an aluminum tab). Second tab 206 may be made from any metal suitable to the design of the battery that is different than first tab 204 (e.g., a copper tab). The tabs of similar metal types may be grouped together in various groups and welded together in parallel to form a battery cell tab. For example, 3 tabs adjacent to and on the same side as first tab 204 could be welded together in parallel to form a single battery cell tab (e.g. a single aluminum battery cell tab). For example, 3 tabs adjacent to and on the same side as second tab 206 could be welded together in parallel to form another single battery cell tab (e.g. a single copper battery cell tab). One of ordinary skill in the art will appreciate that a single battery cell tab may be formed by grouping any number of battery cell tabs.

Figure 3A:
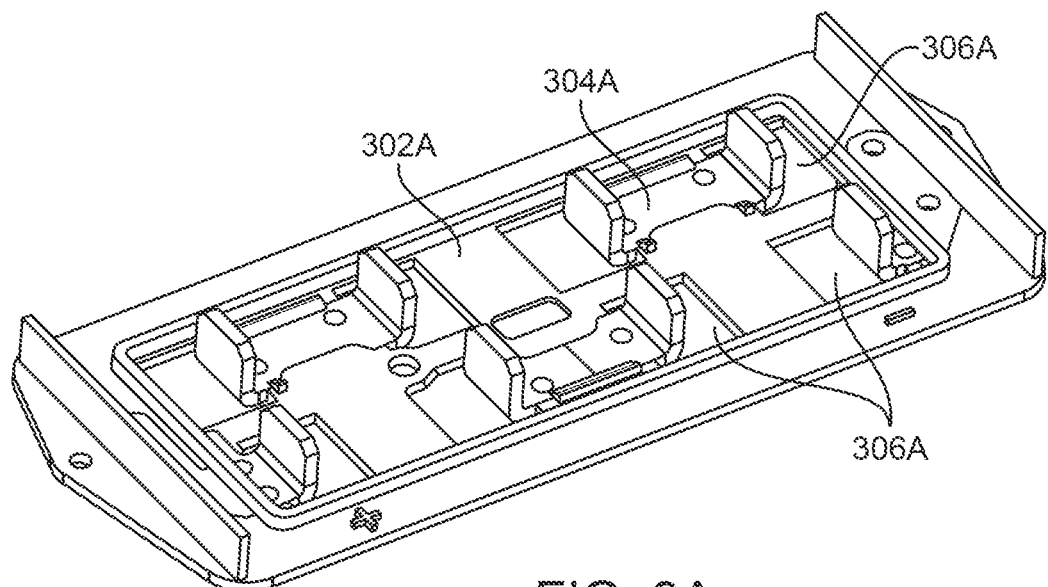
FIG. 3A is a diagram illustrating an exemplary top cover with monometallic interconnects.

FIG. 3A is a diagram showing a conventional battery submodule top cover. Top plate 302A illustrates a substrate that may be coupled with a battery cell submodule to form a top cover to the battery cell submodule. Interconnect 304A illustrates an exemplary interconnect that is coupled to the top plate 302A. Interconnect 304A may be used to connect a plurality of battery cell tabs in series. Tab holes 306A may be cut through top plate 302A to allow battery cell tabs from a battery cell submodule through top plate 302A. The battery cell tabs may be of different materials depending on whether they are connected to an anode or a cathode of a battery cell and may extend through tab holes 306A to make electrical contact with interconnects that are coupled with substrate 302A. The interconnects may then connect each battery cell tab of like material together in series. In conventional battery submodule top covers, each interconnect 304A may be made of a single type of metal (e.g. copper) having same physical properties throughout the interconnect 304A. While the interconnect may form a strong coupling (e.g. strong weld) with a battery tab of the same metal type, the interconnect will form a weak coupling (e.g. weak weld) with a battery tab of dissimilar metal. Thus, the interconnect 304A is prone to failure, causing the entire battery submodule, and potentially the vehicle powered with the battery submodule to fail.

Figure 3B:
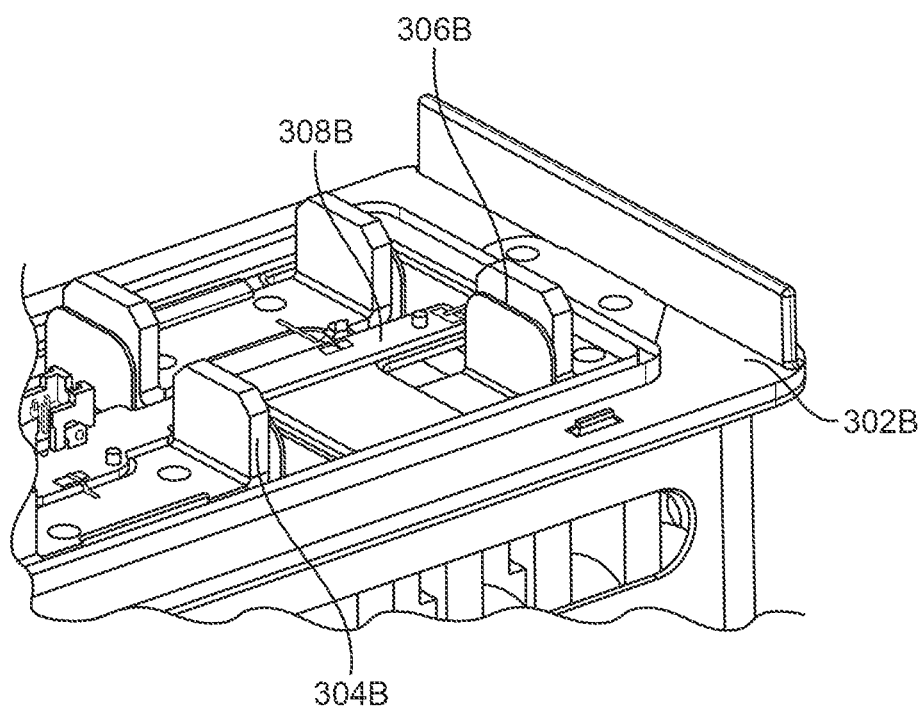
FIG. 3B is a diagram illustrating the contact between a monometallic interconnect and tabs of dissimilar metals.

FIG. 3B is a diagram showing battery submodule top cover mounted in an exemplary battery assembly (e.g., the battery assembly shown in FIG. 1). Substrate 302B is a part of a battery submodule top cover attached to a battery cell submodule. A first connection 304B is formed between a monometallic copper interconnect and an aluminum battery cell tab. As the copper interconnect and the aluminum battery cell tab are of different metals, they form a weak bond that could be at increased risk of fracture due to, for example, vibrational stresses. A second connection 306B is formed between a monometallic copper interconnect and a copper tab. The PCB 308 is a printed circuit board in electrical connection with the interconnects.

Hybrid Interconnects

One problem with earlier designs of the battery submodule top cover is the need to connect interconnects with battery cell tabs made of dissimilar metals. An anode tab may be made from a different material than a cathode tab (e.g., a cathode may have an aluminum tab and an anode may have a copper tab). Coupling the tabs to a conventional interconnect will result in at least one bond between two dissimilar metals (e.g. copper interconnect and aluminum tab, or aluminum interconnect and copper tab). Such bonds are difficult, can further complicate production processes, and may cause weak points that are prone to failure. For example, the battery submodule may be coupled to a battery-powered aircraft. During the natural operation of an aircraft, spinning propellers and air turbulence can lead to an operational environment with significant vibrations that may fracture less robust connections.

A solution to this problem is the use of hybrid interconnects to make robust connections between dissimilar metals. A hybrid interconnect may include an interconnect with two portions having different physical and/or chemical properties. For example, the two portions may be two separate pieces that are coupled together. Alternatively, the two portions may be portions of a single interconnect.

The two portions of a hybrid interconnect may be made from two dissimilar types of metals. These dissimilar metals could include metals that are elementally different from one another (e.g., copper and aluminum), and as such have different physical and/or chemical properties than each other.

Alternatively, the dissimilar metals may include metals that are elementally identical but have different physical properties after undergoing a treatment to alter the physical and/or chemical properties of the metal (e.g., annealing, homogenizing, tempering, etc.).

The two portions of a hybrid interconnect may be coupled in any manner and in one or more coupling means as necessary for the design of the battery. These coupling methods could include bolting them together, welding, brazing, soldering, etc. In some embodiments, the two portions may be parts of a monolithic, unitary interconnect.

According to various embodiments, the battery submodule top cover may include a plurality interconnects (e.g., one or more intermediate interconnects provided between a pair of end interconnects). At least one of the pair of end interconnects and a battery cell tab coupled to the pair of end interconnects may be made of aluminum. According to various embodiments, hybrid interconnects may be used as intermediate interconnects or as end interconnects, where intermediate interconnects may form a link of interconnects between a pair of end interconnects. The first portion of the hybrid interconnect may be adapted to be coupled to a first battery cell tab made of a first metal, and the second portion of the hybrid interconnect may be adapted to couple to a second battery cell tab made of a second metal, different than the first metal. According to various embodiments, the first metal may be aluminum and the second metal may be copper.

Figure 4:
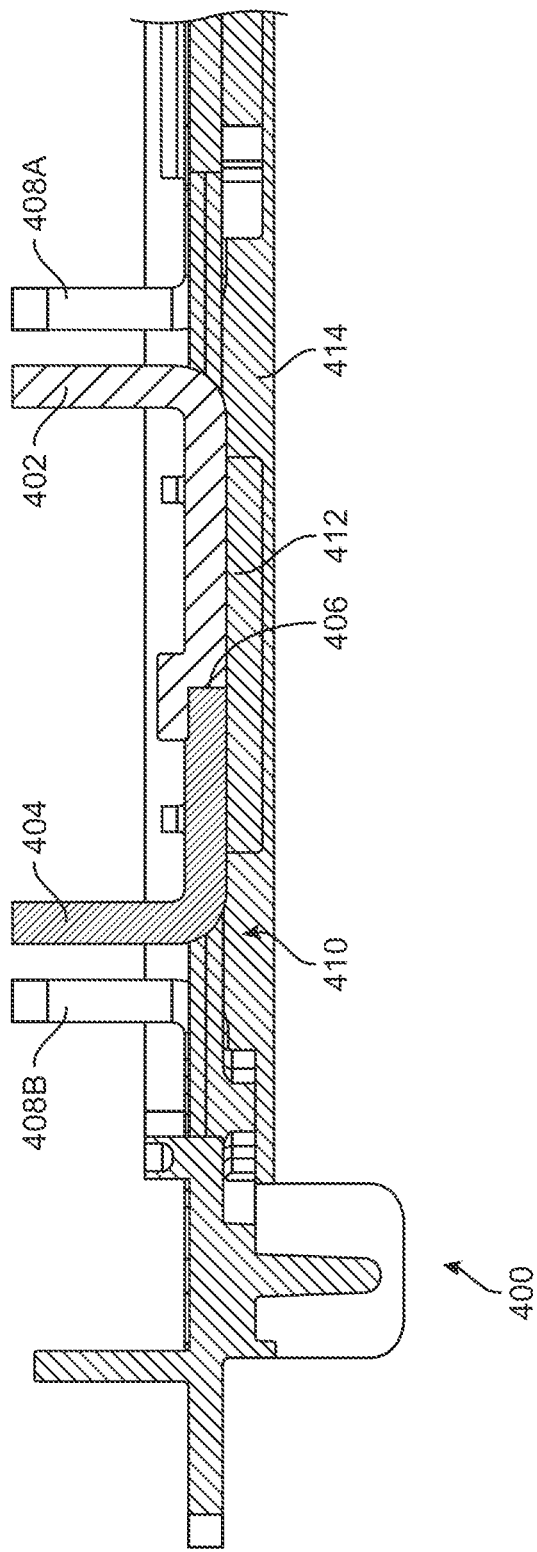
FIG. 4 is a diagram illustrating an exemplary hybrid interconnect including a first portion made of a first metal and a second portion made of a second metal, according to various embodiments.

FIG. 4 is a diagram illustrating an exemplary hybrid interconnect on an exemplary battery submodule top cover where two portions of the interconnect made of different metals are coupled at the center. According to various embodiments, an insert mold element 412 may be formed on a substrate 414 of the battery submodule top cover 400. A hybrid interconnect 410 may be coupled to the insert mold element 412 via one or more coupling means, such as bolting, welding, brazing, soldering, etc.

The hybrid interconnect 410 includes a first portion 402 and a second portion 404. The first portion 402 may be made of a first metal (e.g., aluminum). The first portion 402 may be designed with an additional tab of material extending from its end with the purpose of overlapping with the second portion 404 of the hybrid interconnect 410. As illustrated in FIG. 4, a section of the first portion may extend over a section of the second portion of the hybrid interconnect 410.

The second portion 404 may be made of a second metal different than the first metal (e.g., copper if the first metal type is aluminum). The second portion 404 may be made to facilitate a connection with the first portion 402. The second portion 404 may be a uniform strip of metal, or it may include a groove or notch at the connection point 406 designed to receive the additional tab of material built into the first portion 402.

Connection point 406 shows where the two portions of the interconnect are joined. Connection point 406 may be implemented with a plurality of geometric configurations, including but not limited to, a tab on the first portion 402 extending over and overlapping a part of the second portion 404. The connection point 406 may be maintained through any method of coupling, such as tension maintained by the bolts holding down the first portion 402 and the second portion 404, bonding through welding, brazing, or soldering, etc. Elements 408A and 408B illustrate other hybrid interconnects of the battery submodule top cover 400.

Figure 5:
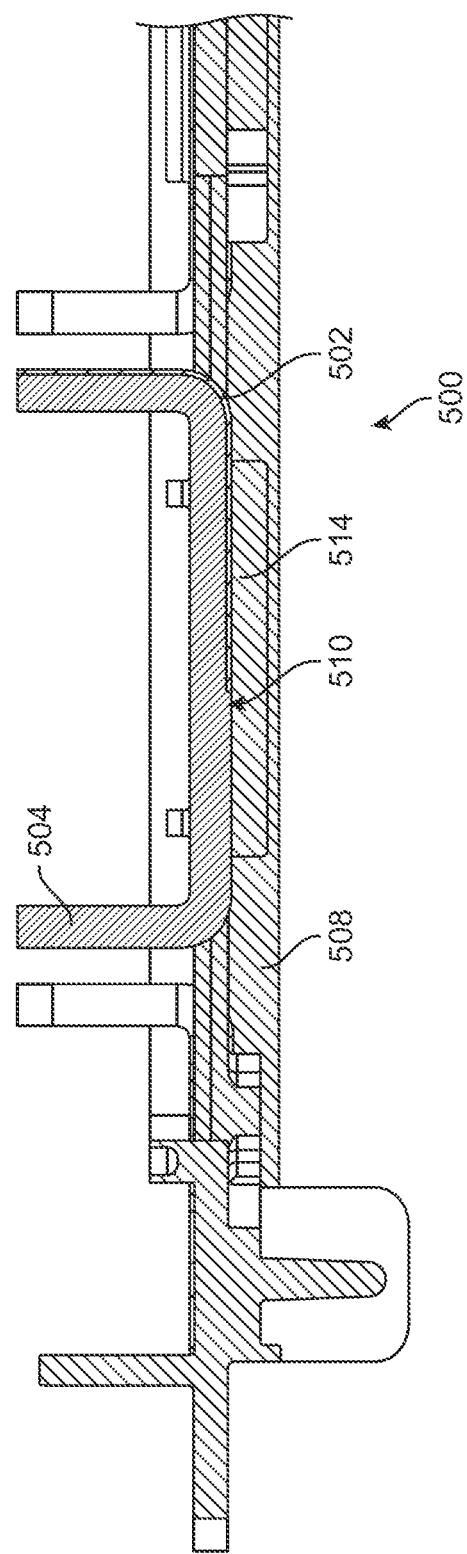
FIG. 5 is a diagram illustrating an exemplary hybrid interconnect where the second portion of the hybrid interconnect forms a thin layer between the interconnect and a battery cell tab, according to various embodiments.

FIG. 5 is a diagram illustrating another example of a hybrid interconnect on an exemplary battery submodule top cover where the first portion of the hybrid interconnect forms an outer layer over at least a section of the second portion of the hybrid interconnect. For example, the first portion may be formed as an outer layer over at least a section of the second portion by cladding.

According to various embodiments, an insert mold element 514 may be formed on a substrate 508 of the battery submodule top cover 500. A hybrid interconnect 510 may be coupled to the insert mold element 514 via one or more coupling means, such as bolting, welding, brazing, soldering, etc.

In some embodiments, the first portion 502 of the hybrid interconnect 510 may be formed over at least a section of the second portion 504 via cladding. The second portion may be formed in the form of a busbar, such that the first portion 502 forms a layer of material between the second portion 504 and a battery cell tab connected to the hybrid interconnect 510. While the first portion 502 is shown here as a thin layer of cladding over the second portion 504, the first portion 502 may be of any suitable thickness for the design of the battery top cover submodule. For example, the thickness of the first portion (e.g. the aluminum layer) may be about 10-50 thou.

The second portion 504 may be made of a first metal (e.g., copper) and may have a section cladded with the first portion 502 made of a second metal (e.g., aluminum), such that the first portion 502 forms an outer layer of material over at least the section of the second portion 504. The first portion 502 may come between the second portion 504 and any electrical connection made between a battery cell tab and the cladded section of the second portion 504.

Figure 6:
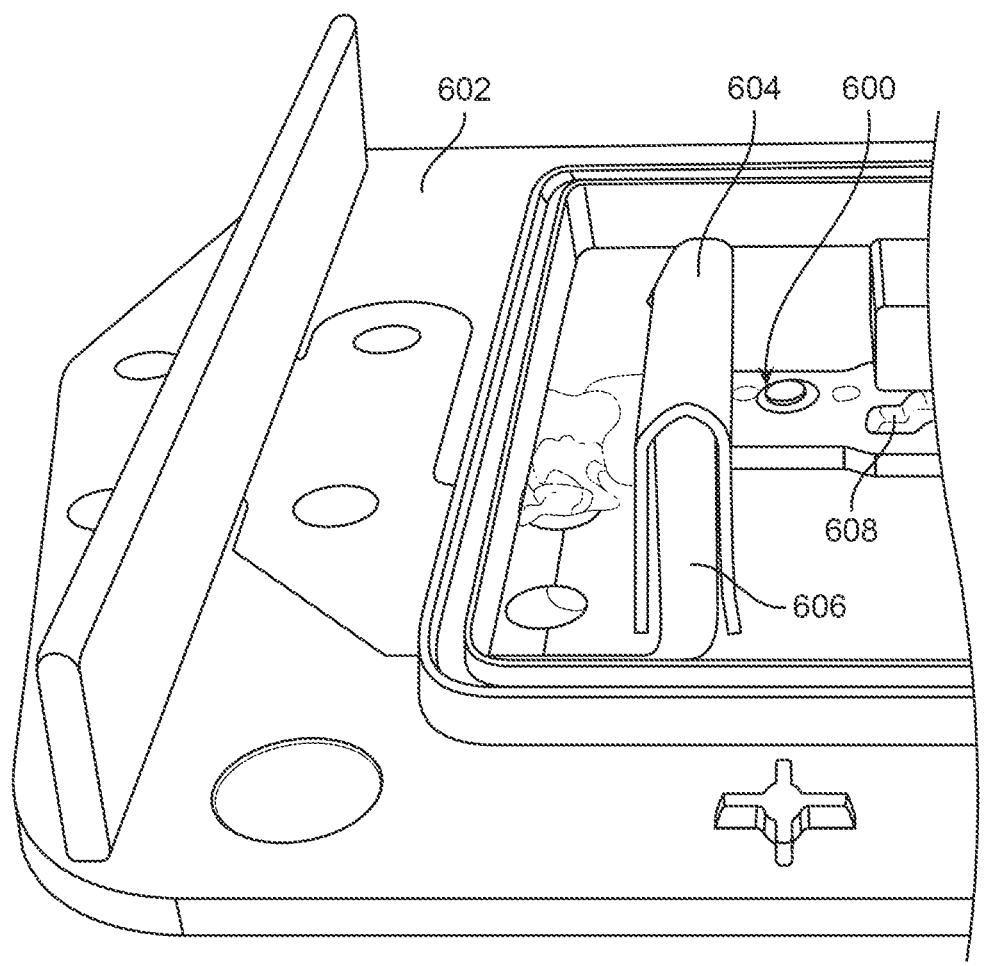
FIG. 6 is a picture illustrating an exemplary hybrid interconnect where the first portion is formed over the second portion in form of a cap, according to various embodiments.

FIG. 6 illustrates an example of a capped hybrid interconnect on an exemplary battery submodule top cover 602. Cap 604 is a cap made from a first metal (e.g., aluminum) that may be the first portion of the hybrid interconnect 600. Cap 604 is formed in such a way as to provide a layer of material that serves as an outer surface between the second portion 606 of the hybrid interconnect 600 and a battery cell tab. As shown in FIG. 6, the first portion may be formed over the second portion 606 forming a cap 604 over the second portion 606.

The second portion 606 of the hybrid interconnect 600 may be monometallic and made of a metal dissimilar to the metal that cap 604 is made of (e.g., if cap 604 is aluminum, then the second portion 606 may be copper). The second portion 606 may have an electrical connection with printed circuit board (PCB) 608.

Figure 7:
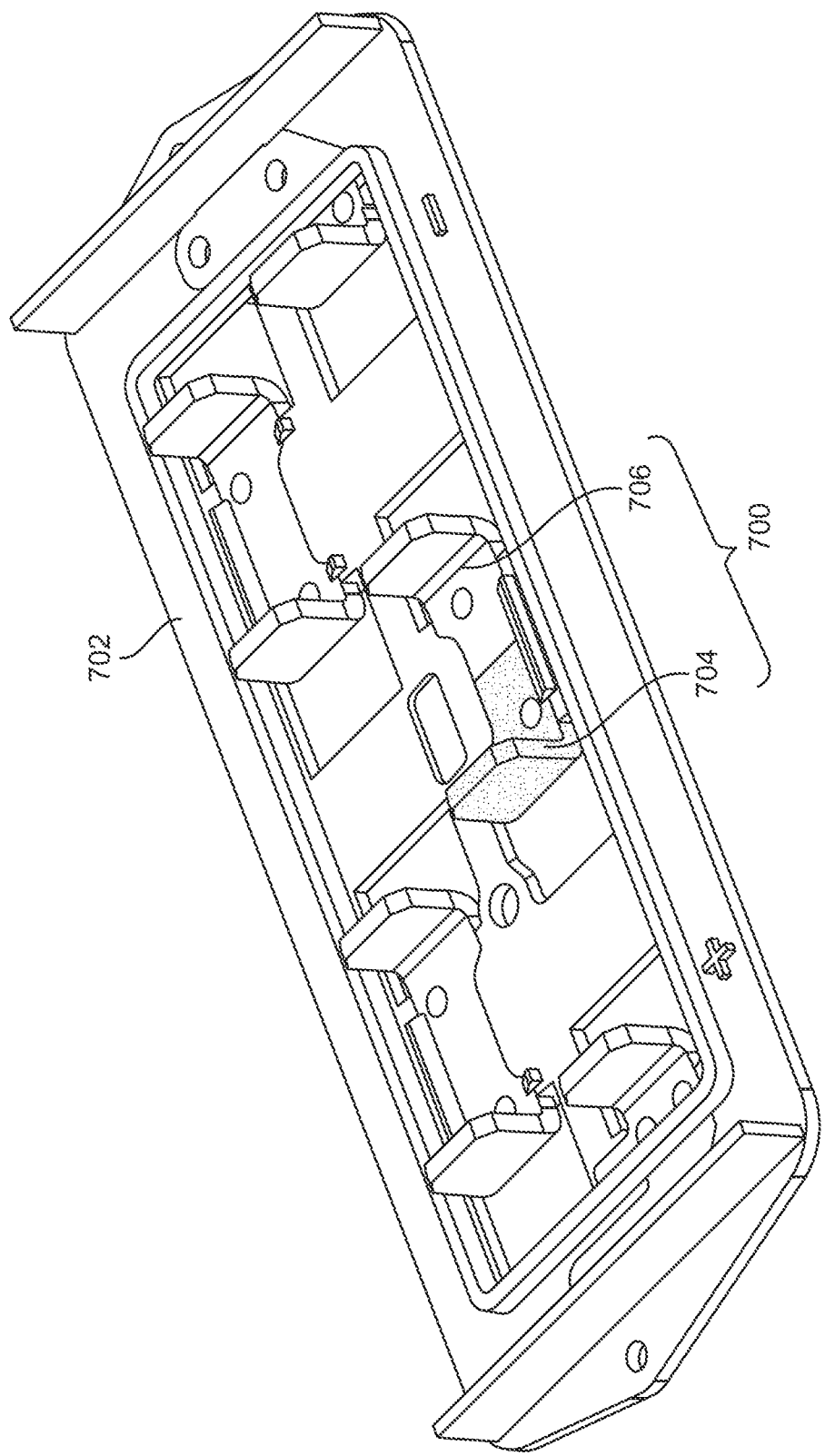
FIG. 7 is a diagram illustrating an exemplary hybrid interconnect where the first portion is annealed metal and the second portion is heat treated metal, according to various embodiments.

FIG. 7 is a diagram illustrating an example of a hybrid interconnect where the first portion is a soft metal annealed section and the second portion is a hard metal heat treated section made of the same metal as the first portion. Substrate 702 is the substrate of a battery submodule top cover of the battery assembly. Substrate 702 is coupled to the other components of the battery submodule top cover, such as the PCB, the interconnects, and the shroud cover. One or more of the interconnects coupled with substrate 702 may be a hybrid interconnect 700. The hybrid interconnect 700 may be formed of a single metal (e.g. aluminum).

The first portion 704 of the hybrid interconnect 700 may be made from an annealed metal to form a soft metal (e.g., soft aluminum) portion of the hybrid interconnect 700. The first portion 704 may have the advantage of forming stronger bonds with battery cell tabs of the same type of metal (e.g., an aluminum battery cell tab welded to an annealed aluminum section of the hybrid interconnect 700 will form a strong bond). The increased ductility of the annealed metal can resist fracture and maintain welded bonds through stronger vibrations than a bond made with metal that is not annealed, and thus more brittle.

The second portion 706 of the hybrid interconnect 700 may be made from metal that has undergone heat treatment hardening to form a hard metal (e.g., hard aluminum) portion. The second portion 706 may form stronger welds with metals with a higher hardness than the metal of the hybrid interconnect 700. For example, the hybrid interconnect 700 may be made out of aluminum and a battery cell tab may be made out of copper. Copper has a naturally higher hardness rating than aluminum, but by raising the hardness level of the aluminum to be welded to the copper, a stronger weld may be formed between the aluminum (e.g. the second portion 706 of the hybrid interconnect 700) and the copper (the battery cell tab).

The variable heat treatment between the first portion 704 and the second portion 706 may be achieved in numerous ways not limited to the following examples. One example method for achieving variable heat treatment could be hardening the entire strip of metal during the manufacturing process, and then annealing one side by a heat clamp prior to installation in a battery submodule top cover. Additionally, the variable heat treatment may also be achieved by heating up the entire interconnect to a temperature suitable for hardening, but then quenching only the hardened section while allowing the soft metal section to air cool.

Implementation and Methodology

Figure 8:
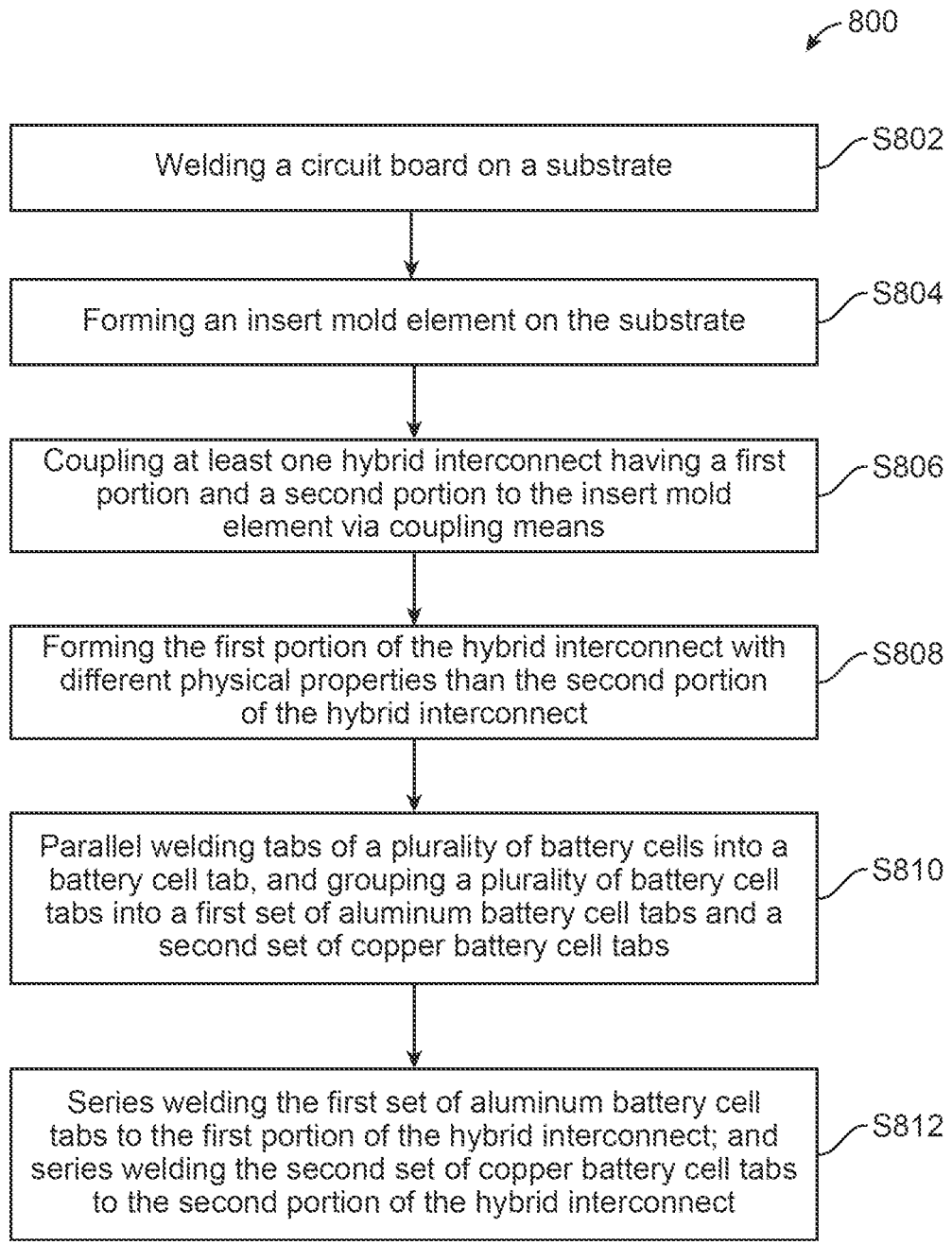
FIG. 8 is a flow diagram illustrating an exemplary method of assembling a battery submodule top cover with hybrid interconnects, according to various embodiments.

FIG. 8 shows an exemplary flow diagram 800 detailing each step in assembling a hybrid interconnect battery top cover submodule and coupling the hybrid interconnect battery top cover submodule to a battery assembly (e.g., battery assembly 100 shown in FIG. 1). In some embodiments, battery cell tabs may be welded in series with the hybrid interconnects.

In step S802, a circuit board is welded onto a substrate such that the two are coupled together. In step S804, an insert mold element is formed on the substrate. The insert mold element may be used to fit various components, such as hybrid interconnects, to the substrate. In step S806, at least one hybrid interconnect (e.g., an interconnect with a first portion made of a first type of metal and a second portion made of a second type of metal) is inserted into the mold element via coupling means. The hybrid interconnect may be coupled by any means needed for the design, including bolts, adhesion, etc. In step S808, the first portion of the hybrid interconnect made from the first metal is formed in preparation for welding to battery cell tabs such that the battery cell tabs are connected to interconnects coupled with the substrate. This forming step may include methods of heat treatment, such as annealing, that may affect the ductility and hardness of the first portion of the hybrid interconnect. In step S810, numerous tabs from battery cells are welded in parallel together into a battery cell tab, where parallel welding tabs may connect a plurality of battery cells electrically in parallel. The anodes and cathodes of the battery cells may be connected to tabs of different metal type (e.g., cathodes may be connected to aluminum tabs and anodes may be connected to copper tabs), and so parallel welding may lead to groups of tabs being welded together in groups by metal type. For example, a first grouping might be a set of aluminum battery cell tabs and a second grouping may be a set of copper battery cell tabs. In step S812, the first set of battery cell tabs (e.g., the aluminum battery cell tabs) may be welded in series to the first portion of the hybrid interconnect. Then, the second grouping of battery cell tabs (e.g., the copper battery cell tabs) may be welded in series with the second portion of the hybrid interconnect such that all of the battery cells associated with each battery cell tab are connected in series.

In some embodiments, the first metal may be aluminum and the second metal may be copper. The first portion of the hybrid interconnect may be made of aluminum and the second portion of the hybrid interconnect may be made of copper.

In other embodiments, the first metal may be aluminum and the second metal may be copper. The hybrid interconnect may be made of aluminum. The flow diagram 800 illustrated in FIG. 8 may further include the steps of annealing the first portion of the hybrid interconnect to form a soft aluminum portion, and heat treating the second portion of the hybrid interconnect to form a hard aluminum portion.

Embodiments provide hybrid interconnects for better coupling with battery cell tabs. According to various embodiments, the battery cell tabs may be formed by parallel welding tabs of a plurality of battery cells into a battery cell tab. A plurality of battery cell tabs may then be grouped into the first set of battery cell tabs and the second set of battery cell tabs. The first set of battery cell tabs may be series welded to the first portion of the hybrid interconnect, and the second set of battery cell tabs may be series welded to the second portion of the hybrid interconnect.

Hybrid interconnects may be formed of a same metal (e.g., aluminum), or a combination of metals (e.g., aluminum and copper). When the hybrid interconnect is monometallic (e.g., made of a single type of metal), portions of the metal may be annealed or heat treated to form a hybrid interconnect with portions having different physical properties. When the hybrid interconnect is multi-metal (e.g., made of a plurality of types of metal), two metals may be coupled together using methods described herein to form a hybrid interconnect with portions having different physical properties. The hybrid interconnect provides two portions with different physical properties, each being better suited to be coupled (e.g. welded) to a different metal. Thus, the hybrid interconnect improves over the conventional interconnects by providing surfaces having different metallic or physical properties. This, in return, improves the quality of coupling (e.g., welding) between the interconnect and battery cell tabs of different metals.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

It is also noted that individual implementations may be described as a process which is depicted as a flowchart, or a flow diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A battery submodule top cover comprising:
a substrate;
a circuit board formed on the substrate;
a hybrid interconnect comprising:
a first portion adapted to couple to a first battery cell tab made of a first metal;
a second portion adapted to couple to a second battery cell tab made of a second metal,
wherein when the hybrid interconnect is made of the second metal, the first portion of the hybrid interconnect is annealed to form a soft metal portion having a first set of physical properties that are similar to physical properties of the first metal and form a stronger bond with the first battery cell tab made of the first metal compared to a bond formed without annealing, and
wherein when the hybrid interconnect is made of the first metal, the second portion of the hybrid interconnect is heat treated to form a hard metal portion having a second set of physical properties that are similar to physical properties of the second metal and form a stronger bond with the second battery cell tab made of the second metal compared to a bond formed without heat treatment,
wherein the second set of properties are different than the first set of physical properties;
a hybrid end interconnect comprising:
a connection element having the second set of physical properties and a cap portion that extends over the connection element, wherein the cap portion has the first set of physical properties, wherein the hybrid end interconnect is adapted to couple to a third battery cell tab made of the first metal; and
an end interconnect having the second set of physical properties and adapted to couple to a fourth battery cell tab made of the second metal.

2. The battery submodule top cover of claim 1, wherein the first metal is aluminum and the second metal is copper.

3. The battery submodule top cover of claim 1, wherein at least a section of the first portion extends over a section of the second portion such that the first portion overlaps with the second portion.

4. The battery submodule top cover of claim 1, wherein the first portion is formed on an outer surface of the second portion such that the first portion forms an outer layer over at least a section of the second portion.

5. The battery submodule top cover of claim 1, further comprising:
an insert mold element formed on the substrate, wherein the hybrid interconnect is coupled to the insert mold element via one or more coupling means.

6. The battery submodule top cover of claim 1, wherein the substrate is a plastic plate.

7. The battery submodule top cover of claim 1, wherein each battery cell tab is formed by parallel welding a plurality of battery cells, and wherein the battery cell tabs connected to interconnects along a same side of the battery submodule top cover are formed by series welding.

8. The battery submodule top cover of claim 1, wherein the hybrid end interconnect and the end interconnect are disposed at opposite ends of the substrate.

9. A system comprising a container, a plurality of battery cells provided in the container, and the battery submodule top cover of claim 1 covering an opening of the container, wherein each battery cell includes two battery cell tabs.

10. A method comprising:

forming a circuit board on a substrate;

electrically connecting a hybrid interconnect to the circuit board, the hybrid interconnect comprising a first portion adapted to couple to a first battery cell tab made of a first metal and a second portion adapted to couple to a second battery cell tab made of a second metal, wherein the hybrid interconnect is made of one of the first metal or the second metal, and wherein electrically connecting the hybrid interconnect comprising at least one of:

annealing the first portion of the hybrid interconnect to form a soft metal portion having a first set of physical properties that are similar to physical properties of the first metal, and welding the first portion of the hybrid interconnect to the first battery cell tab made of the first metal via a stronger bond compared to a bond formed without annealing, and heat treating the second portion of the hybrid interconnect to form a hard metal portion having a second set of physical properties that are similar to physical properties of the second metal, and welding the second portion of the hybrid interconnect to the second battery cell tab made of the second metal via a stronger bond compared to a bond formed without heat treatment, wherein the second set of properties are different than the first set of physical properties;

electrically connecting a hybrid end interconnect to the circuit board, the hybrid end interconnect comprising:

a connection element having the second set of physical properties and a cap portion that extends over the connection element, wherein the cap portion has the first set of physical properties, wherein the hybrid end interconnect is adapted to couple to a third battery cell tab made of the first metal; and electrically connecting an end interconnect to the circuit board, the end interconnect having the second set of physical properties and adapted to couple to a fourth battery cell tab made of the second metal.

11. The method claim 10, wherein the first metal is aluminum and the second metal is copper.

12. The method claim 10, wherein at least a section of the first portion extends over a section of the second portion such that the first portion overlaps with the second portion.

13. The method of claim 10, wherein the first portion is formed on an outer surface of the second portion such that the first portion forms an outer layer over at least a section of the second portion.

14. The method of claim 10, further comprising:

parallel welding individual tabs of a first set of battery cells into the first battery cell tab;

parallel welding individual tabs of a second set of battery cells into the second battery cell tab;

series welding the first battery cell tab to the first portion of the hybrid interconnect; and series welding the second battery cell tab to the second portion of the hybrid interconnect.

\* \* \* \* \*